US007535993B2

(12) United States Patent
Cai et al.

(10) Patent No.: US 7,535,993 B2
(45) Date of Patent: May 19, 2009

(54) CALL CONTROL COMPONENT EMPLOYMENT OF ONE OR MORE CRITERIA FOR INTERNET PROTOCOL CALL SELECTION FOR EAVESDROP COMPONENT MONITORING

(75) Inventors: Yigang Cai, Naperville, IL (US); Xu Chen, QingDao (CN)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1165 days.

(21) Appl. No.: 10/419,521

(22) Filed: Apr. 21, 2003

(65) Prior Publication Data
US 2004/0208165 A1 Oct. 21, 2004

(51) Int. Cl.
H04M 11/04 (2006.01)

(52) U.S. Cl. ............ 379/45; 370/352; 370/390; 379/32.05; 379/35; 379/85; 709/203

(58) Field of Classification Search ............ 370/352, 370/390; 379/32.05, 35, 45, 85; 709/203
See application file for complete search history.

(56) References Cited

U.S. PATENT DOCUMENTS

| 6,504,907 | B1 * | 1/2003 | Farris et al. ............ 379/35 |
| 6,542,602 | B1 * | 4/2003 | Elazar ............... 379/265.06 |
| 6,549,613 | B1 * | 4/2003 | Dikmen ............... 379/70 |
| 6,560,224 | B1 * | 5/2003 | Kung et al. ............ 370/356 |
| 6,600,817 | B1 * | 7/2003 | Shaffer et al. ............ 379/199 |
| 6,765,990 | B2 * | 7/2004 | Freedman et al. ......... 379/32.05 |
| 6,826,173 | B1 * | 11/2004 | Kung et al. ............ 370/352 |
| 6,839,323 | B1 * | 1/2005 | Foti ................ 370/235 |
| 7,123,710 | B2 * | 10/2006 | Ravishankar ........... 379/221.1 |
| 7,151,772 | B1 * | 12/2006 | Kalmanek et al. ......... 370/390 |
| 7,274,685 | B1 * | 9/2007 | Peters ............... 370/352 |
| 7,277,528 | B2 * | 10/2007 | Rao et al. ............ 379/32.01 |
| 2002/0133504 | A1 * | 9/2002 | Vlahos et al. ........... 707/104.1 |
| 2003/0174695 | A1 * | 9/2003 | Lautenschlager et al. ... 370/352 |
| 2003/0182292 | A1 * | 9/2003 | Leong et al. ........... 707/100 |
| 2003/0190032 | A1 * | 10/2003 | Ravishankar ........... 379/229 |
| 2003/0200311 | A1 * | 10/2003 | Baum ............... 709/224 |
| 2004/0165709 | A1 * | 8/2004 | Pence et al. ........... 379/201.01 |
| 2005/0018622 | A1 * | 1/2005 | Halbraich et al. ......... 370/260 |
| 2005/0174937 | A1 * | 8/2005 | Scoggins et al. ........ 370/230 |
| 2006/0112429 | A1 * | 5/2006 | Polzer et al. ............ 726/22 |
| 2006/0212933 | A1 * | 9/2006 | Scoggins et al. ......... 726/11 |

OTHER PUBLICATIONS

Tech Web, "Softswitch"; http://www.techweb.com/encyclopedia/defineterm?term=soft+switch; TechEncyclopedia; Computer Language Company, 5521 State Park Road, Point Pleasant, PA 18950; 4 pgs.; Apr. 21, 2003.
IPCC; Welcome to the International Packet Communications Consortium; http://www.softswitch.org/; Softswitch Consortium, 2694 Bishop Drive, Suite 275, San Ramon, CA 94583; 1 pg.; Apr. 21, 2003.

(Continued)

Primary Examiner—Fan Tsang
Assistant Examiner—Hemant Patel

(57) ABSTRACT

A call control component of an apparatus in one example employs one or more criteria to select one or more internet protocol calls from a plurality of internet protocol calls in an internet protocol network. The call control component sends a copy of one or more portions of the one or more internet protocol calls to one or more eavesdrop components to monitor the one or more portions of the one or more internet protocol calls.

23 Claims, 3 Drawing Sheets

OTHER PUBLICATIONS

IPCC Technical FAQ; IPCC; http://www.softswitch.org/educational/tac_faq.asp; Softswitch Consortium, 2694 Bishop Drive, Suite 275, San Ramon, CA 94583; 5 pg.; Apr. 21, 2003.

Softswitch Consortium; ISC Newsletter, Message from the Chairman; Softswitch Consortium, 2694 Bishop Drive, Suite 275, San Ramon, CA 94583; 6 pgs.; Feb. 2003.

* cited by examiner

CALL CONTROL COMPONENT EMPLOYMENT OF ONE OR MORE CRITERIA FOR INTERNET PROTOCOL CALL SELECTION FOR EAVESDROP COMPONENT MONITORING

TECHNICAL FIELD

The invention relates generally to communications and more particularly to monitoring of an internet protocol call in an internet protocol network.

BACKGROUND

A voice telecommunications network in one example allows a user to place a telephone call to another user of the voice telecommunications network. For example, the voice telecommunications network comprises a public switched telephone network ("PSTN"). The voice telecommunications network employs a call monitor system to monitor telephone calls. For example, the voice telecommunications network may activate the call monitoring system to monitor a conversation in the telephone call. The call monitoring system in one example intercepts the telephone call. Security and/or law enforcement agencies may use the call monitoring system to eavesdrop on the conversation in the telephone call between the users. As one shortcoming, the call monitoring system is available to monitor only public switched telephone network telephone calls.

An internet protocol ("IP") network in one example allows a user to place an internet protocol call to another user of the internet protocol network. The internet protocol call may transfer voice, data, and/or video content between the users of the internet protocol network. As one shortcoming, the internet protocol network lacks a call monitoring system to monitor the internet protocol call.

Thus, a need exists for a call monitoring system for internet protocol calls in a internet protocol network.

SUMMARY

The invention in one embodiment encompasses an apparatus. The apparatus comprises a call control component that employs one or more criteria to select one or more internet protocol calls from a plurality of internet protocol calls in an internet protocol network. The call control component sends a copy of one or more portions of the one or more internet protocol calls to one or more eavesdrop components to monitor the one or more portions of the one or more internet protocol calls.

Another embodiment of the invention encompasses a method. One or more characteristics of a portion of an internet protocol call are identified. The one or more characteristics are compared with one or more selection criteria to make a determination of a match between one or more of the one or more characteristics and one or more of the one or more selection criteria. Upon the determination of the match, a copy of the portion of the internet protocol call is provided for monitoring of the portion of the internet protocol call.

Yet another embodiment of the invention encompasses an article. The article comprises one or more computer-readable signal-bearing media. The article comprises means in the one or more media for identifying one or more characteristics of a portion of an internet protocol call. The article comprises means in the one or more media for comparing the one or more characteristics with one or more selection criteria to make a determination of a match between one or more of the one or more characteristics and one or more of the one or more selection criteria. The article comprises means in the one or more media for providing, upon the determination of the match, a copy of the portion of the internet protocol call for monitoring of the portion of the internet protocol call.

DESCRIPTION OF THE DRAWINGS

Features of exemplary implementations of the invention will become apparent from the description, the claims, and the accompanying drawings in which:

DETAILED DESCRIPTION

Figure 1:
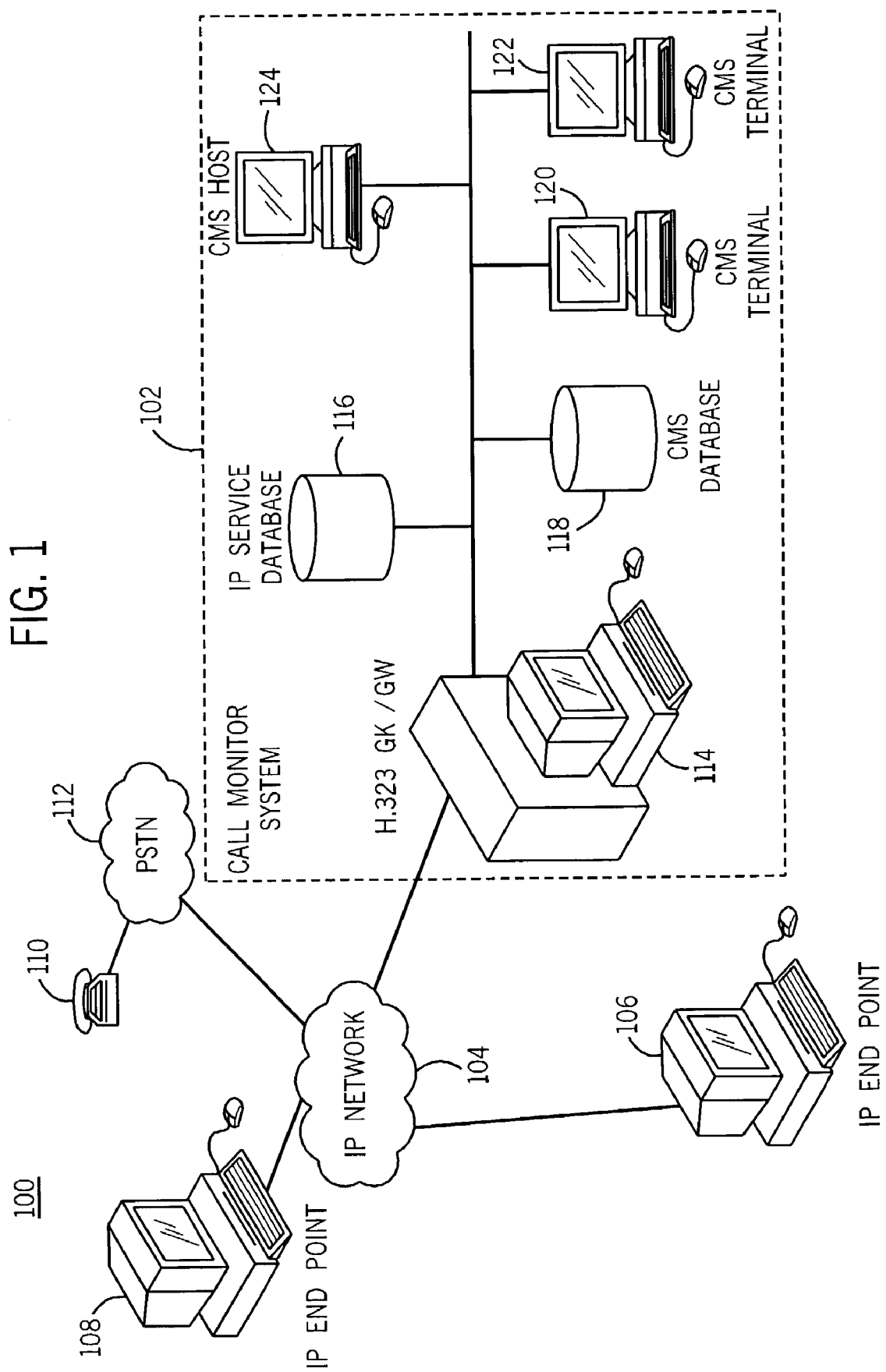
FIG. 1 is a representation of an exemplary implementation of an apparatus that comprises one or more call monitor system components, one or more internet protocol networks, and one or more internet protocol call endpoints.

Turning to FIG. 1, an apparatus 100 in one example comprises a plurality of components such as computer software and/or hardware components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art.

The apparatus 100 in one example comprises one or more call monitor system components 102, one or more internet protocol ("IP") networks 104, and one or more internet protocol call endpoints, for example, internet protocol endpoints 106 and 108 and landline endpoint 110. A public switched telephone network ("PSTN") 112 communicatively couples the landline endpoint 110 with the internet protocol network 104.

The call monitor system component 102 in one example intercepts one or more internet protocol calls. The call monitor system component 102 in one example comprises one or more call control components 114, one or more internet protocol service databases 116, one or more eavesdrop components (e.g., one or more storage components 118 and one or more user interface terminals 120 and 122), and one or more host components 124.

The call control component 114 in one example comprises a processor and a recordable data storage medium. The call control component in one example comprises a softswitch promoted by the International Packet Communications Consortium (IPCC, http://www.softswitch.org). The softswitch controls connection services, applied processes, routing, transfer of control, and management functions for an internet protocol call. The call control component 114 comprises an interface to the internet protocol network 104 for the call monitor system component 102. The call control component 114 in one example comprises an H.323 gate keeper and gateway ("H.323 GK/GW"). "H.323" represents a standard published by the International Telecommunication Union (ITU, http://www.itu.int/home) for real-time voice and videoconferencing in packet networks (e.g., the internet protocol network 104).

The call control component 114 communicates with the internet protocol network 104 by the H.323 communication protocol suite, for example, H.225 (call control), H.245 (control messages), G.711 (audio), and H.261 (video) protocol messages. The call control component 114 communicates with the internet protocol service database 116, the storage component 118, the user interface terminals 120 and 122, and the host component 124 by transmission control protocol/internet protocol ("TCP/IP") messages. The call control component 114 controls media flow and signal flow in the internet protocol network 104. For example, the call control component 114 controls audio, data, and video signaling and bearer traffic. The call control component 114 handles incoming internet protocol call requests and routes the internet protocol call to a termination endpoint of the internet protocol call.

Upon initiation of an internet protocol call, the call control component 114 queries the internet protocol service database 116 to access internet protocol service information for the internet protocol call. The internet protocol service database 116 stores service information of the call monitor system component 102, internet protocol network 104, and the internet protocol endpoints 106 and 108. For example, the call control component 114 requests the internet protocol service information of one or more of the internet protocol endpoints 106 and 108 involved in the internet protocol call. The internet protocol service database 116 returns the requested internet protocol service information to the call control component 114 in a response message. In one example, the internet protocol service database 116 comprises a Java based database engine. In another example, the internet protocol service database 116 comprises a common object request broker architecture ("CORBA") interface.

In one example, the internet protocol service database 116 and the storage component 118 are integrated in a single database. In another example, the internet protocol service database 116 and the storage component 118 comprise a plurality of individual databases. The storage component 118 comprises a call monitor system ("CMS") database.

The one or more eavesdrop components in one example comprise the storage component 118. The storage component 118 in one example comprises a recordable data storage medium. The storage component 118 stores internet protocol call data for the call monitor system component 102. For example, the storage component stores a copy of one or more portions of one or more internet protocol calls for monitoring. The internet protocol call transfers data between an origination endpoint (e.g., the internet protocol endpoint 106) and a termination endpoint (e.g., the internet protocol endpoint 108). The storage component 118 stores the contents of the internet protocol call in a header information block and one or more call data blocks.

The header information block stores call information of the internet protocol call, for example, one or more of call start time, call stop time, information of the origination endpoint, and information of the termination endpoint. The call start time comprises an indication of a point in time when internet protocol call processing setup is complete between the origination endpoint and the termination endpoint. For example, the call start time occurs when the call control component 114 sends an H.225 connect message to the origination endpoint or receives an H.225 connect message from the termination endpoint. The call stop time comprises an indication of a point in time when the internet protocol call is released between the origination endpoint and the termination endpoint. For example, the call stop time occurs when the call control component 114 sends an H.225 release complete message to the origination endpoint or receives an H.225 release complete message from the termination endpoint.

The information of the origination endpoint and the termination endpoint comprise an indication of service and identification information of the origination endpoint and the termination endpoint. For example, the information of the origination endpoint and the termination endpoint comprise one or more indications of one or more of a telephone number, an internet protocol address, and a uniform resource locator ("URL") of the origination endpoint and the termination endpoint. One or more termination endpoints may be involved in the internet protocol call. Therefore, the information of the termination endpoint may comprise an individual entry for each of the one or more termination endpoints.

The one or more call data blocks store data information of the internet protocol call, for example, one or more of data start time, data stop time, port number, data type, contents of a data stream in an incoming channel, and contents of a data stream in an outgoing channel. The internet protocol call transports one or more data types during the duration of the internet protocol call. The internet protocol call in one example comprises one or more of voice, data, and video content. For example, a first portion of the internet protocol call transports voice in a first logical channel, a second portion of the internet protocol call transports data in a second logical channel, and a third portion of the internet protocol call transports video in a third logical channel. The storage component 118 allocates a first call data block of the one or more data blocks to record the voice of the first portion of the internet protocol call. The storage component 118 allocates a second call data block of the one or more data blocks to record the data of the second portion of the internet protocol call. The storage component 118 allocates a third call data block of the one or more data blocks to record the video of the third portion of the internet protocol call.

The data start time comprises an indication of a point in time when the logical channel setup is complete between the origination endpoint and the termination endpoint. For example, the data start time occurs when the logical channel is setup by using H.323 slow start mode, fast start mode, or tunnel mode. The data stop time comprises an indication of a point in time when the call control component 114 and the internet protocol network 104 close the logical channel between the origination endpoint and the termination endpoint through H.245 media control signaling. The port number comprises an indication of a real-time protocol ("RTP") port number that transmits data of the internet protocol call between the origination endpoint and the termination endpoint. The data type comprises an indication of the type of data stored in the data block (e.g., voice, data, or video). Also, the data type comprises an indication of an encode/decode format of the data stored in the data block. The storage component 118 records the contents of the data stream in the incoming channel and the contents of the data stream in the outgoing channel of the internet protocol call.

The one or more eavesdrop components in one example comprise the user interface terminals 120 and 122. The user interface terminals 120 and 122 comprise call monitor system terminals. One or more users may employ one or more of the user interface terminals 120 and 122 to monitor one or more portions of one or more internet protocol calls. For example, the user interface terminal 120 plays a copy of the one or more portions of the one or more internet protocol calls for the one or more users. In one example, the call control component 114 sends the copy of the one or more portions of the one or more internet protocol calls to the user interface terminal 120. In another example, the call control component 114 sends the copy of the one or more portions of the one or more internet protocol calls to the storage component 118 and the user interface terminal 120 retrieves the copy of the one or more portions of the one or more internet protocol calls from the storage component 118.

One or more users may employ one or more of the user interface terminals 120 and 122 to provision one or more criteria for the call monitor system component 102. For example, the one or more users may enter the one or more criteria for the call control component 114 to select one or more internet protocol calls from a plurality of internet protocol calls in the internet protocol network 104. The one or more criteria in one example indicate one or more of the internet protocol call endpoints (e.g., the internet protocol endpoints 106 and 108 and the landline endpoint 110) as call monitor system targets. In one example, the call monitor system target comprises the origination endpoint of a internet protocol call. In another example, the call monitor system target comprises the termination endpoint of the internet protocol call. In yet another example, the call monitor system target comprises both of the origination endpoint and the termination endpoint of the internet protocol call. The call monitor system component 102 stores the one or more criteria in the internet protocol service database 116 accessible to the call control component 114.

The one or more criteria in one example indicate one or more of a telephone number, internet protocol address, and uniform resource locator of the call monitor system target. In one example, the one or more criteria may indicate individual telephone numbers or a range of telephone numbers. In another example, the one or more criteria may indicate individual internet protocol addresses or a range of internet protocol addresses.

The one or more criteria in one example indicate one or more start and/or stop conditions for the call monitor system component 102. The call monitor system component 102 employs the start and/or stop conditions to determine which portions of an internet protocol call to copy and send to the one or more eavesdrop components. The one or more start and/or stop conditions comprise data type based, time based, number of call based conditions.

In one example, the call monitor system component 102 employs the data type based conditions to select a portion of the internet protocol call for monitoring based on the data type of the portion. In another example, the call monitor system component 102 employs the time based conditions to select a portion of the internet protocol call for monitoring based on a time slot of the portion. In yet another example, the call monitor system component 102 employs the number of call based conditions to select a portion of the internet protocol call for monitoring based on a number of calls monitored that involve a specific call monitor system target.

The host component 124 controls access to the one or more eavesdrop components (e.g., the storage component 118 and the user interface terminals 120 and 122). The host component 124 in one example comprises a processor and a recordable data storage medium. The host component 124 comprises a call monitor system host. Upon determination that an internet protocol call is in accordance with the one or more criteria, the call control component 114 sends an indication to the host component 124 for the internet protocol call to be monitored. In response to the indication, the host component 124 allocates a usage of the one or more eavesdrop components to the call control component 114. The one or more eavesdrop components monitor the internet protocol call.

The internet protocol network 104 interfaces the call monitor system component 102 with the internet protocol call endpoints (e.g., the internet protocol endpoints 106 and 108 and the landline endpoint 110). For example, the internet protocol network 104 carries one or more internet protocol calls and messages between the call monitor system component 102 and the internet protocol call endpoints. The public switched telephone network 112 interfaces the landline endpoint 110 with the internet protocol network 104. For example, the public switched telephone network 112 carries one or more calls between the landline endpoint 110 and the internet protocol network 104.

The internet protocol endpoints 106 and 108 initiate or terminate internet protocol calls. For example, the internet protocol endpoints 106 and 108 support the H.323 endpoint protocol. The internet protocol endpoints 106 and 108 in one example comprise internet protocol telephone software and/or an internet protocol telephone. The internet protocol endpoints 106 and 108 register with the call control component 114 as an internet protocol subscriber. For example, the internet protocol endpoints 106 and 108 provide internet protocol service information to the call control component 114. The internet protocol service information in one example comprises identification of the internet protocol endpoints 106 and 108. For example, the identification of the internet protocol endpoints 106 and 108 comprise one or more of an internet protocol phone number, name, internet protocol address, and uniform resource locator of the internet protocol endpoints 106 and 108. The call control component 114 stores the internet protocol service information in the internet protocol service database 116.

Figure 2:
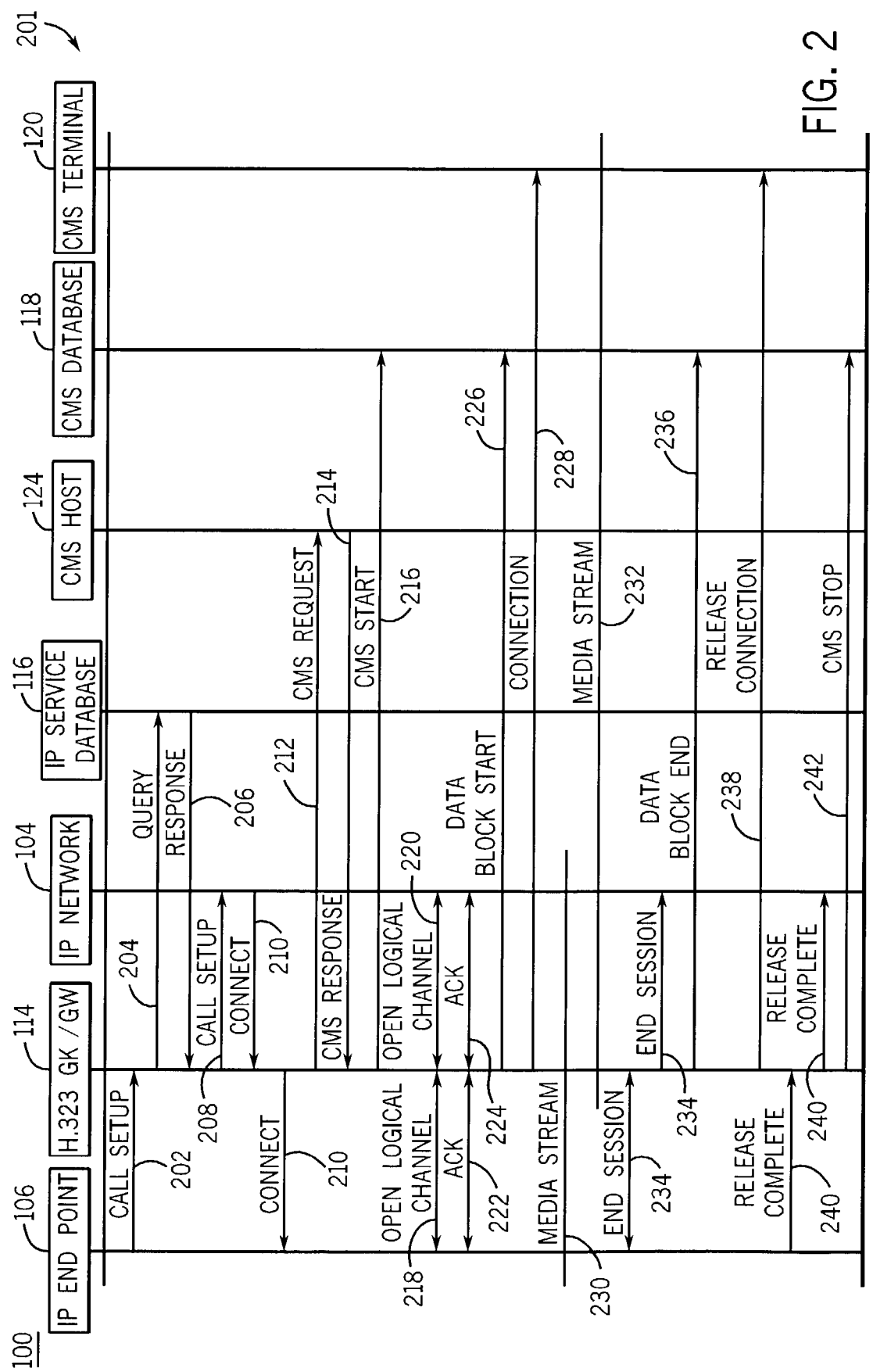
FIG. 2 is a representation of one exemplary message flow for an employment of one or more criteria to select an internet protocol call for monitoring by the call monitor system component of the apparatus of FIG. 1.

Turning to FIG. 2, an illustrative description of one exemplary operation of the apparatus 100 is now presented, for explanatory purposes. A message flow 201 represents an exemplary employment of one or more criteria to select an internet protocol call for monitoring. The call monitor system component 102 employs the one or more criteria to determine whether the internet protocol call involves a call monitor system target. The message flow 201 illustrates one example of the call monitor system target as the origination endpoint (e.g., the internet protocol endpoint 106) of the internet protocol call.

To initiate the internet protocol call with a termination endpoint, the internet protocol endpoint 106 sends a call setup message 202 to the call control component 114. The call setup message 202 in one example comprises an H.225 call processing message. Upon receipt of the call setup message 202, the call control component 114 sends a query message 204 to the internet protocol service database 116. The query message 204 comprises an identification of the internet protocol endpoint 106 and the termination endpoint. The query message 204 requests service information of the internet protocol endpoint 106, service information of the termination endpoint, and one or more criteria. The call control component 114 employs the one or more criteria to determine whether the call monitor system component 102 should monitor the internet protocol call.

The internet protocol service database 116 employs the identification of the internet protocol endpoint 106 and the termination endpoint from the query message 204 to retrieve the service information. The internet protocol service database 116 sends a response message 206 to the call control component 114. The call control component 114 decodes the response message 206. The response message 206 comprises the service information of the internet protocol endpoint 106, service information of the termination endpoint, and the one or more criteria. The internet protocol call in one example matches one or more of the one or more criteria and the call control component 114 determines that the internet protocol endpoint 106 is the call monitor system target. The call control component 114 stores a copy of the one or more criteria for the duration of the interact protocol call.

Upon receipt of the response message 206, the call control component 114 sends a call setup message 208 to the internet protocol network 104. The internet protocol network 104 routes the internet protocol call to the termination endpoint of the internet protocol call. For example, the internet protocol network 104 routes the internet protocol call to the internet protocol endpoint 108 or the public switched telephone network 112. If the public switched telephone network 112 receives the internet protocol call, then the public switched telephone network 112 routes the internet protocol call to the termination endpoint (e.g., the landline endpoint 110).

The termination endpoint of the internet protocol call sends a connect message 210 to the internet protocol network 104. The internet protocol network 104 forwards the connect message 210 to the call control component 114. The call control component 114 forwards the connect message 210 to the origination endpoint of the internet protocol call (e.g., the internet protocol endpoint 106). Upon receipt by the origination endpoint of the connect message 210, the connection between the origination and termination endpoints is setup.

The call control component 114 sends a call monitor system request message 212 to the host component 124. The call monitor system request message 212 comprises an indication of the one or more criteria and information of the call monitor system target (e.g., the internet protocol endpoint 106). The call monitor system request message 212 indicates a request for access to the one or more eavesdrop components. For example, based on the one or more criteria the call control component 114 requests access to the storage component 118 and/or the user interface terminal 120. The message flow 201 illustrates one example of the call control component 114 requesting access to both of the storage component 118 and the user interface terminal 120.

The host component 124 allocates an entry in the storage component 118 and access to the user interface terminal 120 to monitor the internet protocol call. The host component 124 sends a call monitor system response message 214 to the call control component 114. The call monitor system response message 214 comprises an indication of the allocation of the entry in the storage component 118 and a termination identification of the user interface terminal 120 to monitor the internet protocol call. The call control component 114 sends a start call management system message 216 to the storage component 118. The start call management system message 216 comprises an internet protocol call header for storage as the header information in the entry of the storage component 118.

The internet protocol endpoint 106 initiates a media logical channel 218 with the call control component 114. For example, the internet protocol endpoint 106 sends an H.245 message to the call control component 114 to set up the media logical channel 218. Then, the call control component 114 initiates a media logical channel 220 with the termination endpoint of the internet protocol call through the internet protocol network 104. The call control component 114 sends an acknowledgement message 222 to the internet protocol endpoint 106. The termination endpoint sends an acknowledgement message 224 to the call control component 114. The media logical channels 218 and 220 may be unidirectional or bi-directional. The call setup and media logical channel setup in one example is combined as one step if the internet protocol endpoint 106 and the call control component 114 employ either H.323 fast start or the H.245 tunnel message to initiate the internet protocol call.

Once the call control component 114 matches a portion of the internet protocol call in the logical channel 218 with the one or more criteria and the one or more start and/or stop conditions, then the call control component 114 sends a data block start message 226 to the storage component 118. The data block start message 226 opens a data stream to the storage component 118. The data block start message 226 comprises a data block header for storage in the entry of the storage component 118. The call control component 114 also sends a connection message 228 to the user interface terminal 120. The connection message 228 opens a data stream to the user interface terminal 120. The user interface terminal 120 plays the data stream for one or more observers.

The internet protocol call comprises a media stream 230 between the internet protocol endpoint 106, the internet protocol network 104, and the call control component 114. The internet protocol network 104 sends information in the media stream 230 to the termination endpoint. The call control component 114 generates one or more copies of one or more portions of the media stream 230 and sends the one or more copies in a media stream 232 to the storage component 118 and the user interface terminal 120 as an intercepted call.

To end the internet protocol call, either of the internet protocol endpoint 106 and the termination endpoint may send an end session message 234 to the call control component 114. Upon receipt of the end session message 234, the call control component 114 and the internet protocol network 104 close the media logical channels 218 and 220. Then, the call control component 114 sends a data block end message 236 to the storage component 118 and a release connection message 238 to the user interface terminal 120. The data block end message 236 and the release connection message 238 complete the monitoring of the internet protocol call.

The internet protocol endpoint 106 may initiate a new internet protocol call and logical channel after completion of the previous internet protocol call. The call control component 114 starts a new data block in the storage component 118 to record the new internet protocol call and a new data stream to the user interface terminal 120. The internet protocol endpoint 106 may initiate additional internet protocol calls until the internet protocol endpoint 106 sends a release complete message 240 to the call control component 114.

The release complete message 240 releases the internet protocol call. Upon receipt of the release complete message 240, the call control component 114 forwards the release complete message 240 to the internet protocol network 104 and sends a call monitor system stop message 242 to the storage component 118. The call monitor system stop message 242 closes the entry in the storage component 118 and closes the connection between the call control component 114 and the storage component 118.

Figure 3:
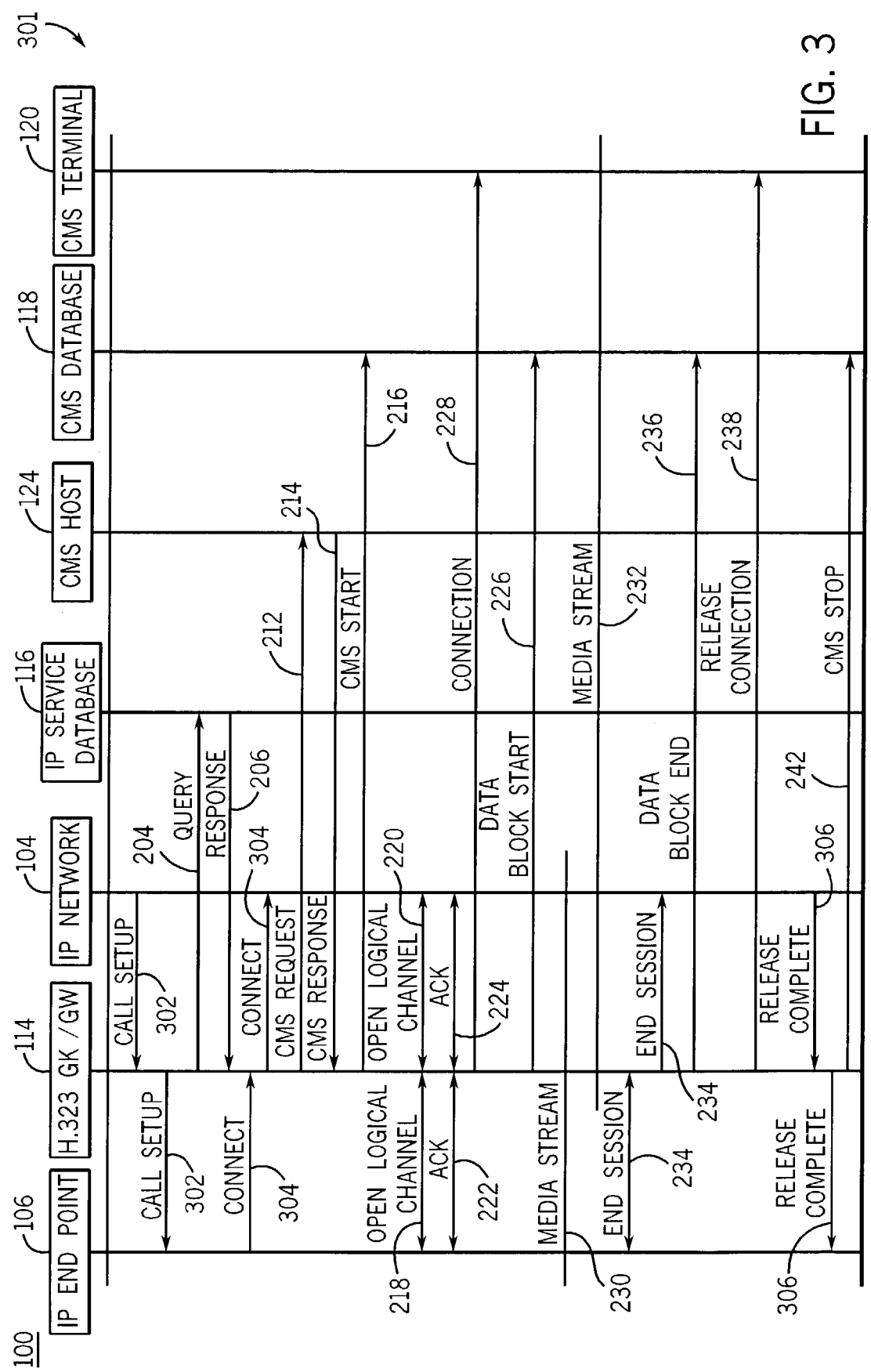
FIG. 3 is a representation of another exemplary message flow for an employment of one or more criteria to select an internet protocol call for monitoring by the call monitor system component of the apparatus of FIG. 1.

Turning to FIG. 3, an illustrative description of another exemplary operation of the apparatus 100 is now presented, for explanatory purposes. A message flow 301 represents an exemplary employment of one or more criteria to select an internet protocol call for monitoring. The call monitor system component 102 employs the one or more criteria to determine whether the internet protocol call involves a call monitor system target. The message flow 301 illustrates one example of the call monitor system target (e.g., the internet protocol endpoint 106) as the destination endpoint of the internet protocol call.

To initiate the internet protocol call with the internet protocol endpoint 106, a origination endpoint (e.g., the internet protocol endpoint 108) sends a call setup message 302 to the internet protocol network 104. The internet protocol network 104 forwards the call setup message 302 to the call control component 114. Then, the call control component 114 forwards the call setup message 302 to the internet protocol endpoint 106. Upon receipt of the call setup message 302, the call control component 114 sends the query message 204 to the internet protocol service database 116. The query message 204 comprises an identification of the internet protocol endpoint 106 and the origination endpoint. The query message 204 requests service information of the internet protocol endpoint 106 and the origination endpoint and one or more criteria to determine if the call monitor system component 102 should monitor the internet protocol call. The query and response of the internet protocol service database 116 in the message flow 301 is analogous to the message flow 201.

The internet protocol endpoint 106 sends a connect message 304 to the call control component 114. The call control component 114 forwards the connect message 304 to the internet protocol network 104. The internet protocol network 104 routes the connect message 304 to the origination endpoint of the internet protocol call. For example, the internet protocol network 104 routes the connect message to the internet protocol endpoint 108. Upon receipt by the origination endpoint of the connect message 304, the connection between the internet protocol endpoint 106 and the origination endpoint is setup.

The call control component 114 employment of the one or more criteria, to select one or more portions of the internet protocol call to copy and send to the one or more eavesdrop components, in the message flow 301 is analogous to the message flow 201. To end the internet protocol call, the origination endpoint sends a release complete message 306 to the internet protocol network 104. The internet protocol network 104 forwards the release complete message 306 to the call control component 114. Then, the call control component 114 forwards the release complete message 306 to the internet protocol endpoint 106. The release complete message 306 releases the internet protocol call.

The apparatus 100 in one example employs one or more computer-readable signal-bearing media. One example of a computer-readable signal-bearing medium for the apparatus 100 comprises one or more instances of the recordable data storage medium of one or more of the call control component 114, the storage component 118, and the host component 124. For example, the recordable data storage medium comprises one or more of a magnetic, electrical, optical, biological, and atomic data storage medium. In another example, a computer-readable signal-bearing medium for the apparatus 100 comprises a modulated carrier signal transmitted over a network comprising or coupled with the apparatus 100, for instance, one or more of a telephone network, a local area network ("LAN"), the internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

We claim:

1. An apparatus, comprising:
a call control component that employs one or more criteria to select one or more internet protocol calls from a plurality of internet protocol calls in an internet protocol network;
wherein the call control component sends a copy of one or more portions of the one or more internet protocol calls to one or more eavesdrop components to monitor the one or more portions of the one or more internet protocol calls; and
wherein the call control component employs, as one of the one or more criteria, a time slot of the one or more portions of the one or more internet protocol calls; and
wherein the call control component stores a copy of the one or more criteria for a duration of the one or more internet protocol calls.

2. The apparatus of claim 1, wherein the one or more portions of the one or more internet protocol calls comprise a data packet stream of an internet protocol call between a first internet protocol endpoint and a second internet protocol endpoint, and wherein the first internet protocol endpoint sends the data packet stream to the call control component; and
wherein the call control component sends the data packet stream to the second internet protocol endpoint to connect the internet protocol call; and
wherein the call control component sends a copy of the data packet stream to the one or more eavesdrop components to monitor the internet protocol call.

3. The apparatus of claim 1, wherein the plurality of internet protocol calls comprises an internet protocol call, wherein the one or more criteria comprise a list of one or more of internet protocol addresses, uniform resource locators, and telephone numbers that correspond to one or more internet protocol call endpoints; and
wherein upon determination by the call control component that the internet protocol call comprises an indication of involvement of one or more of the one or more of the internet protocol addresses, uniform resource locators, and telephone numbers, the call control component sends a copy of one or more portions of the internet protocol call to the one or more eavesdrop components.

4. The apparatus of claim 1 in combination with the one or more eavesdrop components, wherein the one or more eavesdrop components comprise one or more user interface terminals; and
wherein the call control component sends the copy of the one or more portions of the one or more internet protocol calls to the one or more user interface terminals; and
wherein one or more users employ one or more user interface terminals to play the copy of the one or more portions of the one or more internet protocol calls to monitor the one or more portions of the one or more internet protocol calls.

5. The apparatus of claim 1 in combination with the one or more eavesdrop components, wherein the one or more eavesdrop components comprise one or more storage components and one or more user interface terminals; and
wherein the call control component sends the copy of the one or more portions of the one or more internet protocol calls to the one or more storage components, and wherein the one or more storage components store the copy of one or more portions of the one or more internet protocol calls; and wherein the one or more portions of the one or more internet protocol calls comprise a portion of an internet protocol call; and wherein to monitor the portion of the internet protocol call, one or more of the one or more user interface terminals retrieve the copy of the portion of the internet protocol call from the one or more storage components, and wherein the one or more of the one or more user interface terminals plays the copy of the portion of the internet protocol call for one or more users of the one or more of the one or more user interface terminals.

6. The apparatus of claim 1, further comprising a host component that controls access to the one or more eavesdrop components, wherein the plurality of internet protocol calls comprises an internet protocol call; and wherein upon detection by the call control component that the internet protocol call is in accordance with the one or more criteria, the host component allocates a usage of the one or more eavesdrop components to the call control component for monitoring the internet protocol call.

7. The apparatus of claim 1, wherein the one or more criteria to select the one or more internet protocol calls from the plurality of internet protocol calls comprises one or more first criteria; and wherein the call control component employs one or more second criteria to determine which portions of the one or more internet protocol calls to copy and send to the one or more eavesdrop components.

8. The apparatus of claim 7, wherein the one or more portions of the one or more internet protocol calls comprise a portion of an internet protocol call, and wherein upon receipt of the portion of the internet protocol call, the call control component identifies one or more characteristics of the portion of the internet protocol call; and wherein the call control component compares the one or more characteristics with the one or more second criteria; and wherein if one or more of the one or more characteristics match with one or more of the one or more second criteria, then the call control component generates a copy of the portion of the internet protocol call, wherein the call control component sends the copy to the one or more eavesdrop components.

9. The apparatus of claim 7, wherein the one or more second criteria comprise one or more of data type based criteria and time based criteria; and wherein upon receipt of a portion of an internet protocol call of the one or more internet protocol calls, the call control component identifies one or more of data type characteristics and time based characteristics of the portion.

10. The apparatus of claim 1, wherein the plurality of internet protocol calls comprises an internet protocol call, and wherein the one or more criteria comprise a list of one or more internet protocol call endpoints to monitor; and wherein the call control component receives a call setup request from a first internet protocol call endpoint to initiate the internet protocol call with a second internet protocol call endpoint; and wherein the call control component searches the list for an indication of one or more of the first internet protocol call endpoint and the second internet protocol call endpoint.

11. The apparatus of claim 10, wherein the call control component selects the internet protocol call from the plurality of internet protocol calls based on a presence in the list of the indication of the one or more of the first internet protocol call endpoint and the second internet protocol call endpoint; and wherein the call control component sends a copy of one or more portions of the internet protocol call to the one or more eavesdrop components to monitor the one or more portions of the internet protocol call.

12. The apparatus of claim 10 in combination with the one or more eavesdrop components, the apparatus further comprising a host component that controls access to the one or more eavesdrop components;

wherein upon determination that the indication of the one or more of the first internet protocol call endpoint and the second internet protocol call endpoint are on the list, the call control component executes an alert to the host component that the internet protocol call is in accordance with the one or more criteria; and wherein the host component responds to the alert with an allocation of a usage of the one or more eavesdrop components to the call control component; and wherein the call control component sends a copy of one or more portions of the internet protocol call to the one or more eavesdrop components to monitor the one or more portions of the internet protocol call.

13. The apparatus of claim 1, wherein the call control component comprises a softswitch.

14. A method, comprising the steps of:

identifying one or more characteristics of a portion of an internet protocol call;

comparing the one or more characteristics with one or more selection criteria to make a determination of a match between one or more of the one or more characteristics and one or more of the one or more selection criteria;

employing, as one of the one or more selection criteria, a time slot of the one or more characteristics of the portion of the internet protocol call;

providing, upon the determination of the match, a copy of the portion of the internet protocol call for monitoring of the portion of the internet protocol call; and storing a copy of the one or more selection criteria for a duration of the internet protocol call.

15. The method of claim 14, wherein the step of identifying the one or more characteristics of the portion of the internet protocol call further comprises the step of:

determining a first internet protocol call endpoint and a second internet protocol call endpoint that are involved in the internet protocol call.

16. The method of claim 15, wherein the one or more selection criteria comprise a list of one or more internet protocol call endpoints to monitor, wherein the step of comparing the one or more characteristics with the one or more selection criteria to make the determination of the match between the one or more of the one or more characteristics and the one or more of the one or more selection criteria further comprises the step of:

determining that an indication of one or more of the first internet protocol call endpoint and the second internet protocol call endpoint is on the list of the one or more internet protocol call endpoints to monitor.

17. The method of claim 16, wherein the internet protocol call comprises a data packet stream initiated at the first internet protocol endpoint, and wherein the step of providing, upon the determination of the match, the copy of the portion of the internet protocol call for monitoring of the portion of the internet protocol call further comprises the steps of:

sending the data packet stream initiated at the first internet protocol endpoint to the second internet protocol endpoint to connect the internet protocol call; and sending a copy of the data packet stream to one or more eavesdrop components to monitor the internet protocol call.

18. The method of claim 14, wherein the one or more selection criteria comprise an indication of one or more data types to monitor, and wherein the step of identifying the one or more characteristics of the portion of the internet protocol call further comprises the step of:

determining a data type of the portion of the internet protocol call;

wherein the step of comparing the one or more characteristics with the one or more selection criteria to make the determination of the match between the one or more of the one or more characteristics and the one or more of the one or more selection criteria further comprises the step of:

determining that the one or more data types to monitor comprises the data type of the portion of the internet protocol call.

19. The method of claim 14, further comprising the step of:

allocating one or more eavesdrop components for monitoring of the portion of the internet protocol call, wherein one or more users employ one or more of the one or more eavesdrop components to play the portion of the internet protocol call to monitor the portion of the internet protocol call.

20. The method of claim 14, wherein the one or more selection criteria comprise one or more first selection criteria and one or more second selection criteria, wherein the one or more first selection criteria are employed to determine one or more internet protocol calls to monitor, and wherein the one or more second selection criteria are employed to determine one or more portions of the one or more internet protocol calls to monitor; and wherein the step of identifying the one or more characteristics of the portion of the internet protocol call further comprises the steps of:

identifying one or more first characteristics of the internet protocol call; and identifying one or more second characteristics of the portion of the internet protocol call;

wherein the step of comparing the one or more characteristics with the one or more selection criteria to make the determination of the match between the one or more of the one or more characteristics and the one or more of the one or more selection criteria further comprises the steps of:

determining a match between one or more of the one or more first characteristics and one or more of the one or more first selection criteria; and determining a match between one or more of the one or more second characteristics and one or more of the one or more second selection criteria.

21. A computer-readable medium having computer executable instructions for performing steps, comprising:

means in the one or more media for identifying one or more characteristics of a portion of an internet protocol call;

means in the one or more media for comparing the one or more characteristics with one or more selection criteria to make a determination of a match between one or more of the one or more characteristics and one or more of the one or more selection criteria;

means in the one or more media for employing, as one of the one or more selection criteria, a time slot of the one or more characteristics of the portion of the internet protocol call;

means in the one or more media for providing, upon the determination of the match, a copy of the portion of the internet protocol call for monitoring of the portion of the internet protocol call; and means in the one or more media for storing a copy of the one or more selection criteria for a duration of the internet protocol call.

22. The apparatus of claim 1, wherein the call control component stores the copy of the one or more criteria in a database that comprises a common object request broker architecture (CORBA) interface.

23. The apparatus of claim 1, wherein the call control component stores the copy of the one or more criteria in a database that comprises a Java based database engine.

* * * * *